United States Patent Office 3,022,414
Patented Feb. 20, 1962

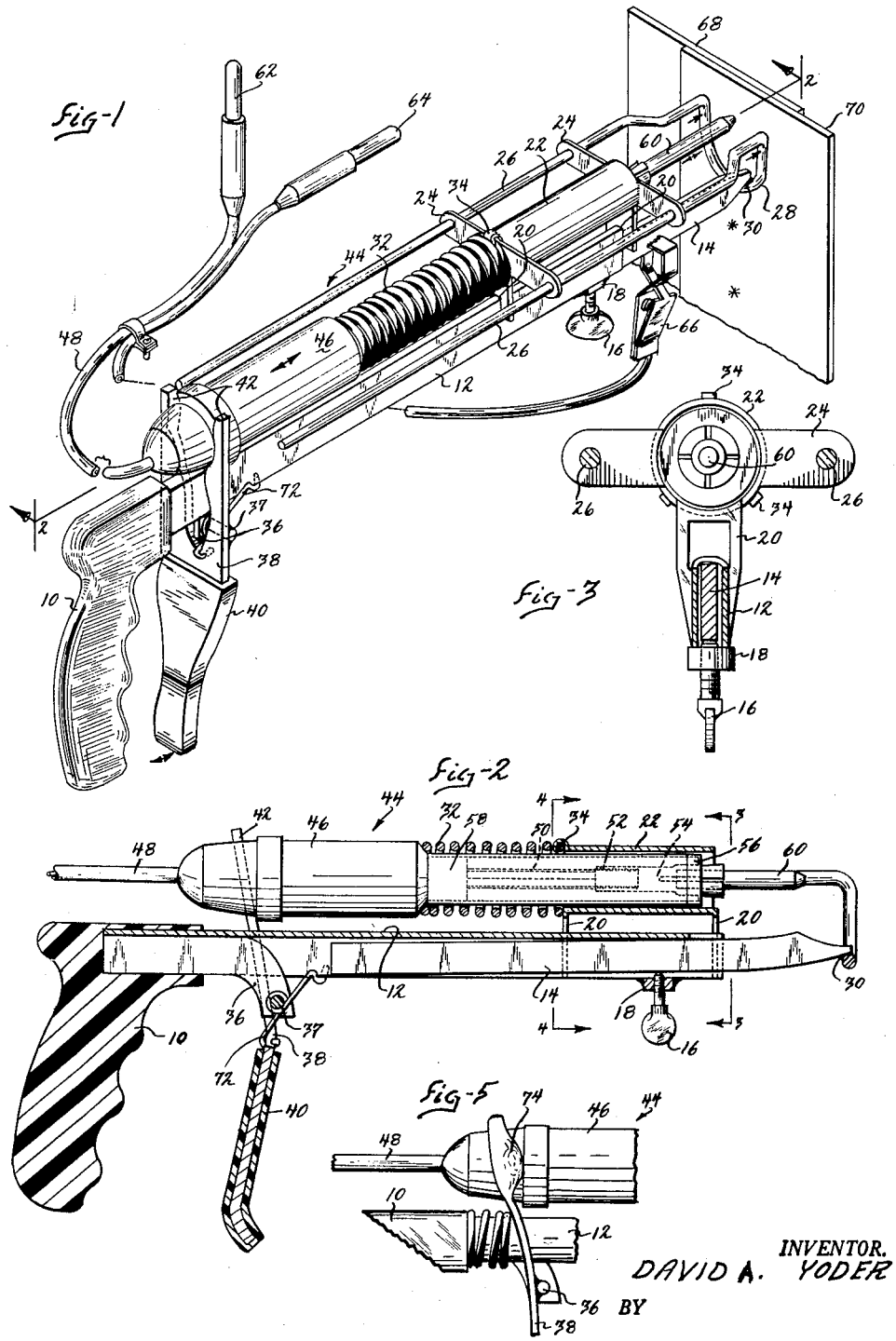

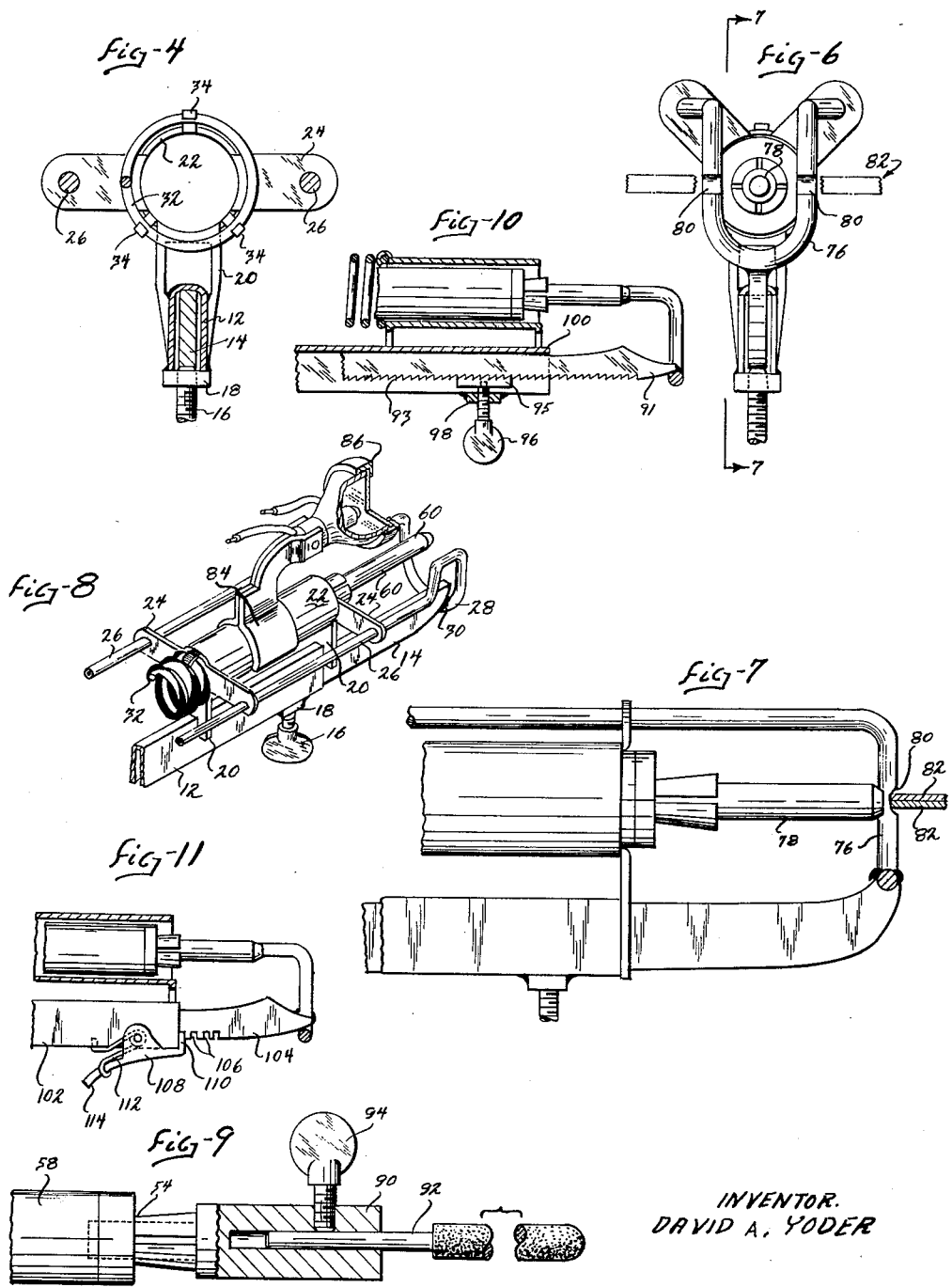

3,022,414
SPOT WELDING GUN
David A. Yoder, 1893 Jermain Drive, Columbus, Ohio
Filed Mar. 16, 1960, Ser. No. 15,291
9 Claims. (Cl. 219—127)

This invention relates to a welding tool and is particularly concerned with a hand welding tool for effecting by hand spot welding operations and the welding of the edges of plates together and for operations similar to brazing operations except that instead of true brazing rod a Phosphor bronze rod or even mild steel or other fillet rod or fillet material could be used, and the like.

In the making of spot welds and the like, particularly for repair work, it is not always possible to have access to both sides of the work being operated on and all of the welding operations and the electrical connections to the work must be made from the one side. In spot welding operations in particular, it is important to maintain a certain pressure on the work so that the proper contact pressure will be developed between the two parts being spot welded together and to be able to establish an arc for heating purposes while this pressure is maintained.

Heretofore, there have been constructed hand welding devices which may be referred to as guns or torches, for the purpose of effecting a work operation of this nature but these have usually been of a highly specialized nature and have, accordingly, been extremely expensive and none are characterized by simplicity of construction or in being simple to use. Some of these devices employ springs for developing pressure on the work and these are at fault because sometimes the work being operated on will be thin whereby the pressure must be kept relatively low and in other cases the work will be thick and in such cases the pressure can be much higher.

In still other cases the devices have feeding means for automatically feeding welding rod or wire through the device and while this is satisfactory for certain classes of work, such a gun or torch or device is of a special nature and thus does not meet the requirements of a simple inexpensive hand tool that can be used in shops where welding jobs that are to be turned out by hand.

With the foregoing in mind, it is a particular object of the present invention to provide a welding device of the nature referred to, particularly a hand welding device, which will be more inexpensive than those heretofore constructed.

Another object of this invention is the provision of a hand welding device of the nature referred to which is quite simple to use and simple in construction.

A particular object of this invention is the provision of a support frame in which a simple hand device can be detachably mounted for operation so that purchasers already having a hand device of the nature referred to can purchase merely the support frame and use an existing hand device therein.

Still another object of this invention is the provision of a support frame for receiving a hand gun or hand welding device, which is readily adjustable to accommodate for different conditions and for consumption of the welding rod or electrode mounted in the device.

Still another object of this invention is the provision of a frame for receiving a hand welding device which can be utilized for welding the edges of sheets of metal together.

It is also an object of this invention to provide a frame for holding a hand welding device of the nature referred to in which access may readily be had to the tip of the electrode in the hand welding device for feeding brazing rod or the like into the heated region.

The several objects and advantages referred to above as well as still other objects and advantages of the present invention will become more apparent upon references to the following specification taken in connection with the accompanying drawings in which:

FIGURE 1 is a perspective view showing a device according to the present invention being utilized for spot welding metal sheets together;

FIGURE 2 is a longitudinal sectional view through the device as indicated by line 2—2 on FIGURE 1;

FIGURE 3 is a sectional view indicated by line 3—3 on FIGURE 2 looking in at the working end of the device;

FIGURE 4 is a sectional view indicated by line 4—4 on FIGURE 2;

FIGURE 5 is a fragmentary view showing a somewhat modified arrangement in which the lever engaging the hand device has curved end portions that form the points of engagement of the lever with the hand device;

FIGURE 6 is an end view of a modified form of the device which is also adapted for the welding of the edges of sheets of material together;

FIGURE 7 is a sectional view indicated by line 7—7 on FIGURE 6 showing the device being employed for welding two sheets of material together;

FIGURE 8 is a fragmentary perspective view showing the manner in which an illuminating means could be mounted on the device to illuminate the area being worked upon;

FIGURE 9 is a fragmentary view showing how a bushing or adapter could be employed for supporting a coated welding rod in the device;

FIGURE 10 is a fragmentary view showing a modification; and

FIGURE 11 is a fragmentary view showing a modified arrangement for providing for adjustability of the two parts of the frame relative to each other.

Referring to the drawings somewhat more in detail, and with particular reference to FIGURES 1 through 4, the device of the present invention comprises a support frame that consists of a handle 10 of electrical insulation material and from which handle there projects an inverted U-shaped metallic support member 12. This support member receives a bar 14 which is adjustable axially in member 12 and is adapted for being clamped in its adjusted positions by a wing nut or thumb screw 16 threaded through a nut 18 welded to the bottom of member 12.

Also welded to member 12 and extending upwardly therefrom are spaced support bars or clips 20 which at their upper ends are attached to a sleeve or tube 22. Sleeve or tube 22 at its opposite ends has laterally extending wing elements 24 which are apertured and through which wing elements there extend the legs 26 of an electrically conductive pressure frame member, the forward end of which is bent into a U-shaped and turned downwardly as indicated at 28 to form a pressure applying element at the forward end of the device which is located in a plane normal to the longitudinal axis of the support frame. The pressure frame member 26 is fixedly attached to the outer end of bar 14 as indicated at 30 so that the pressure frame member and bar are adjustable as a unit in the device.

The tube or cylindrical member 22 has extending from its rear end a spring 32 which may advantageously be fixed in place to the tube or cylindrical member as by the clips 34 which extend from the tube and which may be bent around the end convolution of spring 32.

Returning to the handle end of the device, there is a short curved member 36 extending from the handle and turned downwardly so as to form a support for a pivot pin 37 which at its opposite ends is welded or otherwise fixedly attached to hand lever 38. The lower end of hand lever 38 is coated with an insulated plastic material indicated at 40 and at its upper end is bifurcated so as to form two leg parts 42 extending upwardly above the U-shaped member 12. The leg parts embrace the back end of the hand device for applying pressure thereto. It will be understood that the form of the lever will vary to accommodate hand devices of various nature and that the particular hand device shows only an example of the form that this element can take.

The supporting frame device described is utilized for the purpose of supporting a hand gun or torch or heating device generally indicated at 44 and which may be of special or conventional construction. The device illustrated is of a conventional construction but it will be understood that this device could be especially manufactured for use in the supporting frame of the present invention if so desired. The device 44 comprises an insulating handle 46 into which extends from the rear end the cable 48. Inside the device the cable 48 is attached to a steel post 50 which is threaded at 52 so as to be engageable with the threaded inner end of a collet 54. Collet 54 extends through the insulating bushing 56 mounted in the outer end of a metal tube 58 which is rotatable on handle 46.

By rotating tube 58 and handle 46 relatively in one direction the collet 54 can be drawn in so as to grip electrode 60 whereas relative rotation of the tube and handle in the opposite direction will permit the collet to move outwardly thus to release the electrode 60.

The electrode 60, as illustrated is in the form of a carbon rod which may be solid carbon or which may have a core, depending on whether or not it is desired merely to strike a short arc or whether it is desired to draw a relatively long arc.

In any case, the gun is put in use by connecting a source of welding current between the terminals 62, pertaining to cable 48 and terminal 64 pertaining to a cable leading to a ground clamp 66 which may be attached to the work to form a return path for current or which may be, as illustrated, clamped to a metal part of the support frame or device of the present invention so that the current will flow from the electrode to the work and back into the copper pressure frame 26 and thence through bar 14 to the clamp 66.

The device, after being connected in the described manner, is placed against the work, in this case the metal two sheets 68 and 70, and the desired pressure is developed on the work by pushing on the handle. Thereafter lever 38 is availed out for pushing the hand gun toward the work to bring the electrode into contact therewith to initiate the flow of electric current. A slight retraction of the electrode from the work will then establish an arc which will develop the desired high temperature conditions leading to the spot welding of the material together.

If it is desired to apply a brazing composition to the heated region, it will be noted that the conducting frame 26 is open at the top so the welder can readily feed the brazing rod or the like downwardly into the heated region.

The spring 32 provides adequate bias for causing the hand device to retract in the supporting frame when the pressure on lever 38 is released and the hand device can readily be removed from the supporting frame merely by swinging lever 38 to its extreme counterclockwise position as it is viewed in FIGURES 1 and 3 and withdrawing the device 44 for use in circumstances where the supporting frame is not necessary or cannot be introduced.

To prevent the device 44 from accidentally falling from the supporting device, there is preferably a torsion spring 72 provided which serves to keep the lever against the hand device but which is readily overcome by spring 32 when the lever 38 is released.

As will be seen in FIGURE 5, the upper ends of the legs of the lever which actuates the hand device to and fro may be provided with curved surfaces 74, if so desired, to prevent or reduce abrading of the end of the hand device.

In FIGURES 6 and 7 there is shown a modified arrangement wherein the electrically conductive pressure exerting frame portion 76 is so formed as to extend a substantial distance above the center of the electrode 78. This frame is then formed with notches 80 which are in alignment with the electrode 78 so that sheets of material as at 82 in FIGURE 7 can be placed in the grooves 80 and will be held together thereby so that the electrode 78 can be advanced into contact with the edges of the sheet to strike an arc to heat the material for the welding together or the brazing thereof. It will be noted that the structure of the pressure applying frame of FIGURES 6 and 7 is applicable in all cases where the frame of the first described modification is applicable and in addition can be used for edge work along sheets of metal.

FIGURE 8 illustrates the manner in which a device 84 could be provided which would snap about the cylindrical portion of the supporting device and which carries an illuminating means 86 which will direct a beam of light to strongly eliminate the area being worked upon. This illuminating device can be battery operated or it could have wires leading therefrom to receive current either from the source of welding current or from a regular lighting circuit. In either case the region being worked upon will be strongly illuminated so that it can be observed through the protective glass of a welding helmet or welding goggles prior to striking the arc.

The previously described modifications have all illustrated the use of carbon electrodes of various types but it is also possible directly to weld with the device of the present invention by placing a welding rod in the hand device and depositing a layer of metal directly therefrom. This is illustrated in FIGURE 9 wherein there is an adapter member 90 mounted in the collet of the hand device and which receives the end of coated welding rod 92 that is retained into position by a thumb screw 94.

FIGURE 10 shows a modification in which the adjustable bar 90 has a serrated or saw tooth edge 92 that is engageable by a block 94 which is adjustable to and from engagement with the said saw tooth edge by a wing nut or thumb screw 96 threaded through a nut member 98 welded to the bottom of the inverted U-shaped support frame 100. The block 94 preferably has a recess in the bottom for receiving the end of screw 96 and has its other side formed with saw teeth or serrations so that when it is engaged with the bar 90 the bar 90 is positively prevented from shifting in the support member 100 and thus will permit extremely high pressures on the work to be developed by pushing on the handle of the gun.

In all of the previously described modifications the frame of the device is comprised of two portions which are adjustable relative to each other to provide for changing the length of the device. In the first modification the two parts of the frame were clamped together by screw threaded means and in the modification of FIGURE 10 the two parts were attached together by means of serrations or saw teeth formed on the one part of the frame and a saw tooth block engageable with the teeth on the frame carried by the other part.

FIGURE 11 shows an arrangement whereby the frame part carrying the handle is indicated at 102 and adjustable therein is the other frame part 104. In this modification the frame part 104 is provided with a plurality of notches 106 along its lower edge and pivoted to frame part 102 is a pawl or lever 108 having an end part 110 adapted for entering the notches 106. This end part 110 is positioned so that it also engages the end of frame part 120 so that high pressures can be developed by pushing on the gun when this is necessary without in any way damaging the pawl 108.

Pawl 108 is spring urged into engagement with frame member 104 by spring 112 and the end of the pawl at 114 can be availed of for triggering it out of engagement with frame part 104 when it is desired to adjust the frame of the device.

A feature of the present invention resides in the fact that both electrical connections can be made to the gun thus eliminating the necessity for making a connection with the work. This is of particular benefit where a large area is to be covered because it allows free travel in any direction with the gun and no time is lost in making connection with the work. This is automatically accomplished when the electrically conductive frame is pushed against the work.

It will be understood that this invention is susceptible to modification in order to adapt it to different usages and conditions; and, accordingly, it is desired to comprehend such modifications within this invention as may fall within the scope of the appended claims.

I claim:

1. In a hand operated welding gun; a frame comprising a first member having a handle at one end and a second member supported for longitudinal adjustment on the said first frame member, sleeve means on said first frame member at the end opposite the handle for reciprocably receiving an electrode holder for longitudinal reciprocation in the frame, and means on the second member for applying pressure to work in a region radially spaced from the tip of an electrode in an electrode holder in the said first member, there being a lever adjacent the handle engageable with the end of the electrode holder opposite said sleeve means for moving the electrode holder in one direction in the sleeve means, and there being a spring between the sleeve means and the electrode holder for urging the electrode holder in the opposite direction.

2. In a hand operated welding gun; a first frame member comprising a handle and a support member extending therefrom, a second frame member comprising a bar like portion slidably engaging said support member and adapted for being clamped thereto, a pressure element having a U-shaped end portion and attached to said second frame member having a U-shaped end at the end opposite the handle and said U-shaped end portion being located in a plane normal to the direction of the length of the gun, means on the first frame member for supporting an electrode holder thereon for reciprocation of the electrode holder lengthwise of the gun on an axis extending within the confines of said U-shaped end portion of the pressure element, a lever pivoted to the first frame member adjacent the handle engaging said electrode holder so movement of the lever will move the electrode holder in one direction, and a spring on the first frame member also engaging said electrode holder for moving it in the opposite direction.

3. In a hand operated welding gun; a first frame member having a handle and a support member extending therefrom, a second frame member comprising a bar like portion slidably engaging said support member and adapted for being clamped in adjusted positions thereto, a pressure element attached to said second frame member having a U-shaped end portion at the end thereof opposite the handle in a plane normal to the direction of the length of the gun, a sleeve portion on the first frame member adapted for receiving an electrode holder for sliding movement on an axis extending within the confines of said U-shaped end portion of the pressure element, a spring on the handle end of the sleeve for urging the electrode holder in a direction away from work engaged by the said U-shaped end of the pressure element, a lever pivoted to the support member adjacent the handle having an end part engaging said holder for moving the holder toward said work, said lever being swingable away from the holder to permit the holder to be removed from the gun, and a spring urging the lever toward the holder to prevent the holder from accidentally falling from the gun.

4. In a welding gun; a frame having a handle at one end and a U-shaped pressure element at the other end, said frame being adjustable in length to vary the distance between the handle and pressure element, a sleeve on the frame in fixed position relative to the handle located on an axis extending substantially through the center of the said U-shaped pressure element, an electrode holder of said sleeve having an electrode at the end adjacent said pressure element, a spring between the handle end of the sleeve and said holder to urge the holder away from work engaged by said pressure element, a lever pivoted to the frame adjacent said handle having one end engaging said holder so movement of the other end of the lever toward the handle will advance the holder toward the said work, said lever being moveable into position to permit the handle to be removed from the gun, and a spring urging the lever toward the holder to retain the holder in the gun.

5. In a welding gun; a frame comprising two straight support members adapted for being clamped together in various positions of axial adjustment whereby the length of the gun can be varied, a handle at one end of one of said members, a pressure frame carried at the other end of said members and comprising a U-shaped end part positioned in a plane normal to the length of the gun, means on the said one of the frame members for reciprocably supporting an electrode holder for movement on an axis extending within the confines of said U-shaped end portion of the pressure frame, manual means on said one member adjacent the handle for effecting the reciprocation of the electrode carried by the holder into and out of engagement with the work engaged by the said pressure frame, and the said means for clamping said members together comprising screw threaded means carried by one of the members and engaging the other thereof.

6. In a welding gun; a frame comprising two straight support members adapted for being clamped together in various positions of axial adjustment whereby the length of the gun can be varied, a handle at one end of one of said members, a pressure frame carried at the other end of said members and comprising a U-shaped end part positioned in a plane normal to the length of the gun, means on the said one of the frame members for reciprocably supporting an electrode holder for movement on an axis extending within the confines of said U-shaped end portion of the pressure frame, manual means on said one member adjacent the handle for effecting the reciprocation of the electrode carried by the holder into and out of engagement with the work engaged by the said pressure frame, and said means for clamping said members together comprising a toothed block, screw threaded means on one of said members operable for urging the toothed block against the other said members, and the said other member having teeth engageable with the teeth on the said block.

7. In a welding gun; a frame comprising two straight support members adapted for being clamped together in various positions of axial adjustment whereby the length of the gun can be varied, a handle at one end of one of said members, a pressure frame carried at the other end of said members and comprising a U-shaped end part positioned in a plane normal to the length of the gun, means on the said one of the frame members for reciprocably supporting an electrode holder for movement on an axis extending within the confines of said U-shaped end portion of the pressure frame, manual means on said one member adjacent the handle for effecting the reciprocation of the electrode carried by the holder into and out of engagement with the work engaged by the said pressure frame, the said means for adjustably clamping said members together comprising notches formed on one of said members, a pawl engageable with said notches pivoted to the other said members, spring means urging the pawl into engagement with said notches thereby to clamp the said members together, and a trigger attached to the said pawl and manually operable for disengaging the pawl to permit adjustment of said members.

8. In a welding gun; a frame comprising two straight support members adapted for being clamped together in various positions of axial adjustment whereby the length of the gun can be varied, a handle at one end of one of said members, a pressure frame carried at the other end of said members and comprising a U-shaped end part positioned in a plane normal to the length of the gun, means on the said one of the frame members for reciprocably supporting an electrode holder for movement on an axis extending within the confines of said U-shaped end portion of the pressure frame, manual means on said one member adjacent the handle for effecting the reciprocation of the electrode carried by the holder into and out of engagement with the work engaged by the said pressure frame, said pressure element comprising a conductive wire of substantial cross section having portions extending rearwardly along the gun from the upper ends of the legs of the said U-shaped end portion thereof, and wing elements carried by said one frame member having apertures through which the rearwardly extending portions of the pressure frame slidably extend.

9. In a welding gun; a frame having a handle at one end and a U-shaped pressure element at the other end in a plane normal to the length of the gun, said frame being adjustable in length to vary the distance between the U-shaped pressure element and the handle, means on the gun for reciprocably supporting an electrode holder for movement toward and away from said pressure element and on an axis extending within the confines of said pressure elements, said electrode holder being adapted for supporting an electrode engageable with work that is engaged by the pressure element, said pressure element having notches in alignment with each other and with the axis of said electrode whereby the edges of sheets can be engaged by said notches and held together while the said electrode is brought into operative engagement therewith.

References Cited in the file of this patent

UNITED STATES PATENTS

| | | |
|---|---|---|
| 1,897,606 | Cole et al. | Feb. 14, 1933 |
| 2,761,955 | Sholle | Sept. 4, 1956 |
| 2,817,003 | Dusek | Dec. 17, 1957 |
| 2,898,445 | Slezak | Aug. 4, 1959 |